US012701133B2

(12) United States Patent
Surana

(10) Patent No.: US 12,701,133 B2
(45) Date of Patent: Aug. 4, 2026

(54) SCANNING OF CODEBASES FOR VULNERABLE CLOUD RESOURCE DEPENDENCIES

(71) Applicant: Trend Micro Incorporated, Tokyo (JP)

(72) Inventor: Nitesh Surana, Bengaluru (IN)

(73) Assignee: Trend Micro Incorporated, Tokyo (JP)

( * ) Notice: Subject to any disclaimer, the term of this patent is extended or adjusted under 35 U.S.C. 154(b) by 117 days.

(21) Appl. No.: 18/883,275

(22) Filed: Sep. 12, 2024

(65) Prior Publication Data

US 2025/0385932 A1     Dec. 18, 2025

(30) Foreign Application Priority Data

Jun. 13, 2024   (IN) .............................. 202411045840

(51) Int. Cl.
*H04L 9/40*          (2022.01)
(52) U.S. Cl.
CPC ...... *H04L 63/1433* (2013.01); *H04L 63/1483* (2013.01)
(58) Field of Classification Search
None
See application file for complete search history.

(56) References Cited

U.S. PATENT DOCUMENTS

| | | | | |
|---|---|---|---|---|
| 11,245,717 | B1 * | 2/2022 | Edwards ............. | H04L 63/1433 |
| 2020/0042712 | A1 * | 2/2020 | Foo ....................... | G06F 21/577 |
| 2020/0065160 | A1 * | 2/2020 | Park .......................... | G06F 8/42 |
| 2021/0141717 | A1 * | 5/2021 | Ananthapur Bache ...................... | |
| | | | | G06F 11/3688 |
| 2023/0122784 | A1 * | 4/2023 | Khan ................. | H04L 63/0236 |
| | | | | 726/3 |
| 2023/0130115 | A1 * | 4/2023 | Liu ..................... | H04L 61/4511 |
| | | | | 726/1 |
| 2023/0185922 | A1 * | 6/2023 | Sullivan ............... | G06F 21/577 |
| | | | | 726/25 |
| 2024/0281539 | A1 * | 8/2024 | Cao ....................... | G06F 21/577 |
| 2025/0047687 | A1 * | 2/2025 | Duan ................. | H04L 63/0236 |
| 2025/0141907 | A1 * | 5/2025 | Modasiya ............ | H04L 63/107 |
| 2025/0310367 | A1 * | 10/2025 | du Preez ............ | H04L 63/1425 |
| 2025/0371136 | A1 * | 12/2025 | Weizman ............. | G06F 21/552 |

OTHER PUBLICATIONS

Marco Squarcina, Mauro Tempesta, Lorenzo Veronese, Stefano Calzavara, Matteo Maffei, TU Wien, Università Ca' Foscari Venezia, "Can I Take Your Subdomain? Exploring Related-Domain Attacks in the Modern Web", Dec. 3, 2020.

(Continued)

*Primary Examiner* — Michael Pyzocha
(74) *Attorney, Agent, or Firm* — Beyer Law Group LLP

(57) ABSTRACT

Vulnerable cloud resource dependencies are identified in codebases. A codebase is scanned for references to one or more cloud resources. Untrusted cloud resources are identified by comparing the referenced cloud resources to an inventory of trusted cloud resources. An untrusted cloud resource is detected to be vulnerable to a cyberattack in response to determining that a subdomain of the untrusted cloud resource cannot be resolved to an Internet Protocol (IP) address by a Domain Name System (DNS) server and can be registered with a cloud service provider.

20 Claims, 5 Drawing Sheets

400

(56) References Cited

OTHER PUBLICATIONS

Eric Pauley, Ryan Sheatsley, Blaine Hoak, Quinn Burke, Yohan Beugin, Patrick McDaniel, "Measuring and Mitigating the Risk of IP Reuse on Public Clouds", In 43$^{rd}$ IEEE Symposium on Security and Privacy, Apr. 11, 2022.

Daiping Liu, Shuai Hao, Haining Wang, "All Your DNS Records Point to Us, Understanding the Security Threats of Dangling DNS Records", University of Delaware, College of William and Mary, Downloaded Dec. 9, 2024.

Gafnit Amiga, "Azure Cloud Shell Command Injection Stealing User's Access Tokens",https://web.archive.org/web/20230929043103/https:/blog.lightspin.io/azure-cloud-shell-command-injection-stealing-users-access-tokens, Sep. 20, 2022.

Scott Lindh, "AWS/S3 Subdomain Takeover", Medium, InfoSec Write-ups, https://infosecwriteups.com/aws-s3-subdomain-takeover-79d705cc3553, Jan. 17, 2024.

"EdOverflow/can-i-take-over-xyz, Can I take over XYZ?—a list of services and how to claim (sub)domains with dangling DNS records", GitHub, https://github.com/EdOverflow/can-i-take-over-xyz, Downloaded Apr. 9, 2024.

"A Guide To Subdomain Takeovers", Hackerone Community Blog, Application Security, Hacker Resources, https://www.backerone.com/hackerone-community-blog/guide-subdomain-takeovers, Aug. 15, 2018.

"Microsoft Azure MCR VSTS CLI vstscli Uncontrolled Search Path Element Remote Code Execution Vulnerability, ZDI-24-208 ZDI-CAN-23012", Zero Day Initiative, https://www.zerodayinitiative.com/advisories/ZDI-24-208/, Feb. 26, 2024.

"Prevent dangling DNS entries and avoid subdomain takeover", Microsoft Learn, https://learn.microsoft.com/en-us/azure/security/fundamentals/subdomain-takeover, Mar. 27, 2024.

"Domain name registrar", Wikipedia, https://en.wikipedia.org/wiki/Domain_name_registrar, Downloaded Apr. 11, 2024.

Matt Bryant, Bishop Fox Alumnus, "Fishing the AWS IP Pool for Dangling Domains", Bishop Fox, https://bishopfox.com/blog/fishing-the-aws-ip-pool-for-dangling-domains, Oct. 7, 2015.

"'Zero-Days' Without Incident—Compromising Angular via Expired npm Publisher Email Domains", The Hacker Blog, https://thehackerblog.com/zero-days-without-incident-compromising-angular-via-expired-npm-publisher-email-domains-7kZplW4x/, Feb. 11, 2022, Downloaded May 8, 2024.

"Measuring and Mitigating the Risk of IP Reuse on Public Clouds", https://arxiv.org/abs/2204.05122, Submitted on Apr. 11, 2022, Downloaded May 8, 2024.

* cited by examiner

400

SCANNING OF CODEBASES FOR VULNERABLE CLOUD RESOURCE DEPENDENCIES

CROSS-REFERENCE TO RELATED APPLICATION

This application claims the benefit of Indian Patent Application No. 202411045840 filed on Jun. 13, 2024, which is incorporated herein by reference in its entirety.

TECHNICAL FIELD

The present disclosure is directed to cybersecurity.

BACKGROUND

Subdomain hijacking occurs when an attacker (i.e., cybercriminal, hacker) takes control of a subdomain of a legitimate domain. This can happen when a subdomain points to a webpage that has been decommissioned or is no longer in use. Attackers can attempt to claim the abandoned service endpoint, such as a specific Uniform Resource Locator (URL) at a hosting service and set up their own content under the legitimate domain's subdomain. This exposes users who navigate to the subdomain using a web browser to cross-site scripting, malware distribution, and other web-related cyberattacks.

A codebase comprises a collection of source codes that are used to build a particular software development project or application. The source codes may be in different files and stored in one or more repositories of the codebase. For example, a codebase may have a corresponding repository on a version control platform, such as the GitHub platform. Codebases may be analyzed to detect vulnerabilities in open source dependencies by Bill of Materials (BOM) analysis, Software Composition Analysis (SCA), and other code analysis solutions. However, existing code analysis solutions do not adequately address the dynamic nature of cloud resources that are referenced in codebases.

BRIEF SUMMARY

In one embodiment, a method of scanning a codebase to identify dependencies on vulnerable cloud resources includes identifying a plurality of trusted cloud resources that are accessible over a computer network. A codebase is received from a codebase repository. The codebase is scanned for a reference to one or more cloud resources that are accessible over the computer network. For each referenced cloud resource that is referenced in the codebase, the referenced cloud resource is flagged as an untrusted cloud resource responsive to determining that the referenced cloud resource is not one of the plurality of trusted cloud resources. For each untrusted cloud resource, the untrusted cloud resource is detected as vulnerable to being exploited by a cyberattack in response to determining that a subdomain of the untrusted cloud resource cannot be resolved into an Internet Protocol (IP) address by a Domain Name System (DNS) server and that the subdomain of the untrusted cloud resource can be registered with a cloud service provider.

In another embodiment, a computer system comprises at least one processor and a memory, the memory of the computer system stores instructions that when executed by the at least one processor of the computer system cause the computer system to: receive a codebase from a codebase repository; scan the codebase for a reference to one or more cloud resources that are accessible over a computer network; for each referenced cloud resource that is referenced in the codebase, flag the referenced cloud resource as an untrusted cloud resource responsive to determining that the referenced cloud resource is not in an inventory of a plurality of trusted cloud resources; and for each untrusted cloud resource, detect that the untrusted cloud resource is vulnerable to being exploited by a cyberattack in response to determining that a subdomain of the untrusted cloud resource cannot be resolved into an IP address by a DNS server and that the subdomain of the untrusted cloud resource can be registered with a cloud service provider.

In yet another embodiment, a method of scanning a codebase to identify dependencies on vulnerable cloud resources includes scanning a codebase for references to cloud resources that are accessible over a computer network. A referenced cloud resource that is referenced in a source code of the codebase is detected. The referenced cloud resource is compared to an inventory of trusted cloud resources. The referenced cloud resource is detected to be vulnerable to being exploited by a cyberattack in response to detecting that the referenced cloud resource is not listed in the inventory of trusted cloud resources and that the subdomain of the referenced cloud resource cannot be resolved into an IP address by a DNS server.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
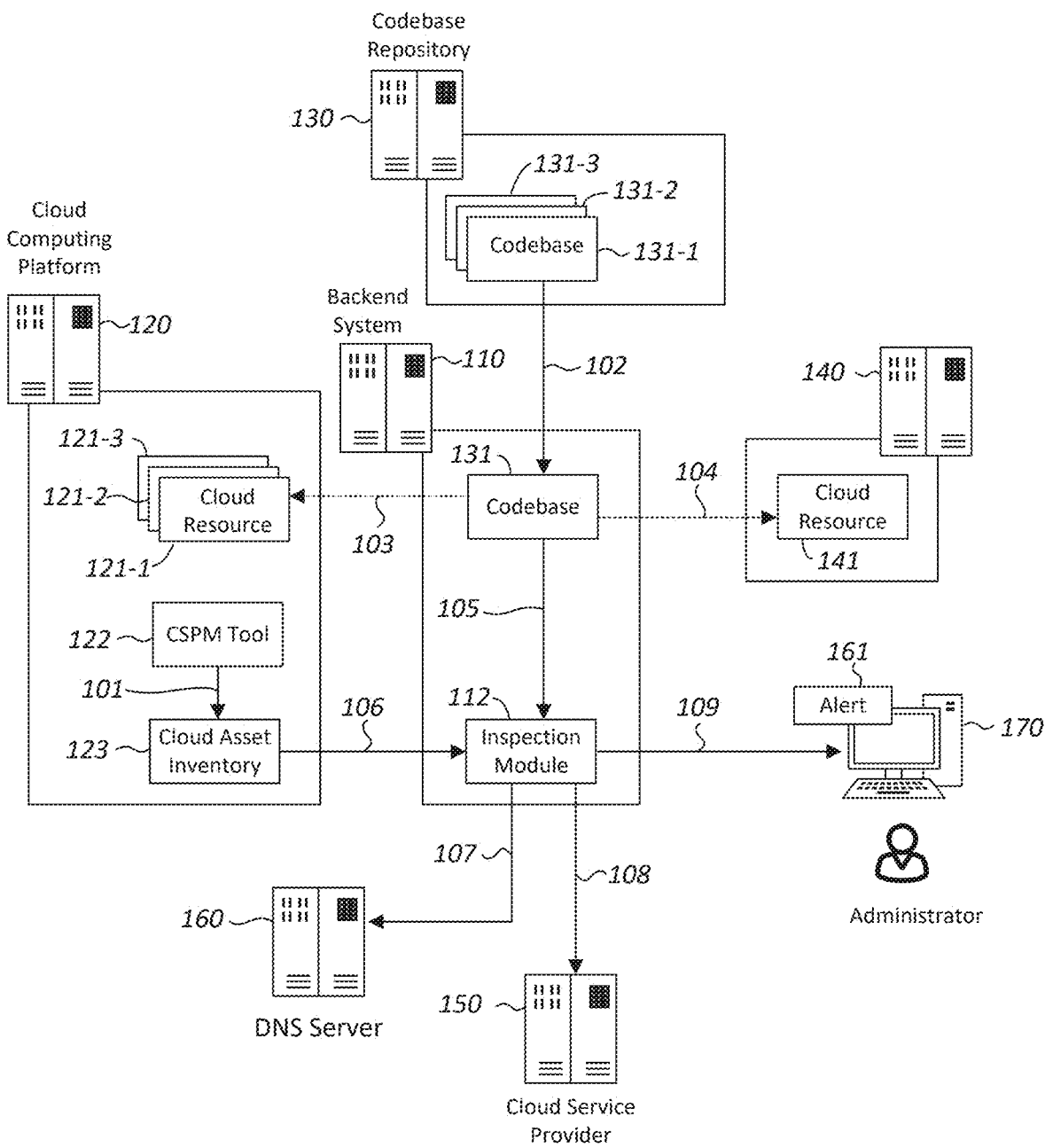
FIG. 1 shows a block diagram of a backend system for scanning codebases for dependency on vulnerable cloud resources, in accordance with an embodiment of the present invention.

FIG. 1 shows a block diagram of a backend system 110 for scanning codebases for dependency on vulnerable cloud resources, in accordance with an embodiment of the present invention. The backend system 110 may be implemented on a cloud computing platform, dedicated server system, or other computer system. The backend system 110 includes at least one processor and a memory that stores instructions of an inspection module 112. The instructions of the inspection module 112, when executed by the at least one processor, cause the backend system 110 to operate as described herein to detect vulnerable cloud resources that are referenced in a codebase.

A cloud computing platform 120 may be provided by a cloud service provider and may comprise the Microsoft Azure™ cloud computing platform, for example. In the example of FIG. 1, an organization owns or trusts one or more cloud resources 121 (121-1, 121-2, 121-3, etc.) that are hosted on the cloud computing platform 120. The organization may be an individual, a private company, a government, an educational institution, or other entity.

A cloud resource is a component, service, or infrastructure that is accessible over a computer network. Examples of cloud resources include cloud storage, container registry, and serverless offerings (e.g., Function App) of cloud computing platforms. Cloud resources may have well-defined domain endpoints with user-controlled data in the subdomain. A codebase may reference a cloud resource by its subdomain in a source code of the codebase. Table 1 below shows example cloud resources and their corresponding domain format.

TABLE 1

| Cloud Resource | Domain Format |
|---|---|
| Azure Container Registry | *.azurecr.io |
| Azure Storage Account | *.(blob\|file\|core\|queue).core.windows.net |
| Azure Function Apps | *.azurewebsites.net |
| Azure CDN | *.azureedge.net |
| Azure API Management | *.azure-api.net |
| Azure Front Door | *.azurefd.net |
| Azure Virtual Machines | *.<region>.cloudapp.azure.com |
| AWS S3 | *.s3.amazonaws.com |

The * (asterisks) in the example domain formats of Table 1 are user-defined and hence, user controlled. A codebase that references a cloud resource is dependent on that cloud resource, i.e., has dependency on that cloud resource. Examples of codebases that may have cloud resource dependencies include codebases in the GitHub repositories, GitHub Actions workflows, docker-compose YAMLs, and Kubernetes YAMLs.

An example source code snippet of a codebase that references a cloud resource is as follows:

```
FROM sbidprod.azurecr.io/quinault:latest
ARG CNMS_BUILD_DIR
RUN apt -y update
RUN apt-get -y upgrade
RUN apt install -y ebdtables
RUN apt install -y net-tools
COPY $CNMS_BUILD_DIR/azure-cnms /usr/bin/azure-cnms
RUN chmod +x /usr/bin/azure-cnms
CMD ["/usr/bin/azure-cnms"]
```

The above example source code snippet is a Dockerfile. In the FROM directive, the Dockerfile references the "latest" tag of a container image named "quinault" located in a Microsoft Azure™ Container Registry named "sbidprod" as the base image. The Microsoft Azure™ Container Registry resources have the domain format as "*.azurecr.io" where the asterisk is a user-supplied parameter. The subdomain is thus "sbidprod.azurecr.io". The Dockerfile was found on official Microsoft GitHub repositories. The inventor has discovered that the Container Registry named "sbidprod" can be registered under the inventor's Microsoft Azure™ subscription and host the container image named "quinault". That is, the inventor was able to register the cloud resource subdomain "sbidprod.azurecr.io" and host the container image "quinault". Since the official GitHub repository would be trusted, attackers could abuse this trust and achieve arbitrary code execution on dependent systems by taking over the Microsoft Azure™ Container Registry.

A codebase may directly reference a cloud resource by including the subdomain of the cloud resource in the codebase itself as in the example source code snippet. As another example, a codebase that implements an Infrastructure as Code (IaC) (e.g., Docket Compose; Kubernetes YAML) Continuous Improvement/Continuous Delivery/Deployment (CI/CD) solution may directly reference the Microsoft Azure™ cloud resource in one or more of its source codes. A codebase may also indirectly reference a cloud resource, for example by calling a function of a third-party library that in turn directly references the cloud resource.

Current subdomain hijacking research has been limited to websites. The inventor believes that because the vast majority of cloud resources are accessible by subdomain in codebases, the subdomains of cloud resources are also susceptible to hijacking. Research conducted by the inventor on cloud resources hosted on the Microsoft Azure™ computing platform has revealed over 6,000 referenced cloud resources that may be susceptible to hijacking by an attacker that has a Microsoft Azure™ account. By hijacking the subdomains of these cloud resources, an attacker could craft attack vectors ranging from phishing to supply chain compromises resulting in arbitrary code execution on dependent codebases and systems.

In the example of FIG. 1, a Cloud Security Posture Management (CSPM) tool 122 is hosted on the cloud computing platform 120 for identifying and remedying security risks and compliance violations in the cloud computing platform 120. The CSPM tool 122 may be a CSPM tool that is available on the cloud computing platform 120, such as the Microsoft Defender for Cloud™ on the Microsoft Azure™ cloud computing platform, the AWS Security Hub™ on the Amazon Web Services (AWS)™ cloud computing platform, or the Security Command Center™ for the Google Cloud™ computing platform. The CSPM tool 122 may be employed to identify all cloud resources that are active and trusted by a particular organization. A cloud resource is trusted relative to an organization when it is owned by the organization or trusted by the organization. A cloud resource is active when it is actively used by the organization.

In one embodiment, a cloud asset inventory 123 has a listing of all active cloud resources 121 that are trusted by the organization, as identified by the CSPM tool 122 (see arrow 101). In the example of FIG. 1, the cloud asset inventory 123 is stored on the cloud computing platform 120, e.g., cloud storage of the cloud computing platform 120. The list of all active cloud resources that can be trusted by an organization is a union set of the list from the CSPM tool 122 and the list of cloud resources that are trusted by cloud service providers.

The inspection module 112 evaluates a codebase 131 for dependencies on cloud resources that are vulnerable to being exploited by cyberattacks. The backend system 110 may receive a codebase 131 from the codebase repository 130 (see arrow 102). In the example of FIG. 1, the codebase 131 is owned by the same organization that trusts the cloud resources 121. The codebase 131 (i.e., a source code of the codebase 131) includes a reference to a cloud resource 121 (see arrow 103) and another reference to a cloud resource 141 that is hosted on a computer system 140 (see arrow 104). Unlike the cloud resource 121, the cloud resource 141 is not trusted by the organization, i.e., the cloud resource 141 is an untrusted cloud resource. It is to be noted that the computer system 140 may be the cloud computing platform 120 or other computer system. That is, the cloud resource 141 may also be hosted on the computing platform 120.

The inspection module 112 scans the codebase 131 to identify references to cloud resources (see arrow 105) and compares the identified referenced cloud resources to cloud resources in the cloud asset inventory 123 (see arrow 106). In one embodiment, the inspection module 112 deems cloud resources that are in the cloud asset inventory 123 to be trusted and cloud resources that are not in the cloud asset inventory 123 to be untrusted. From entries in the cloud asset inventory 123, the inspection module 112 detects that the cloud resource 121 that is referenced in the codebase 131 is trusted, whereas the cloud resource 141 that is also referenced in the codebase 131 is untrusted. The inspection module 112 flags the cloud resource 141 and other untrusted referenced cloud resources in the codebase 131 as untrusted for further inspection.

In one embodiment, the inspection module 112 further inspects an untrusted cloud resource by determining if the untrusted cloud resource resolves (see arrow 107), i.e., whether the subdomain of the untrusted cloud resource can be resolved by a DNS server 160 into a corresponding Internet Protocol (IP) address that is necessary for locating and accessing the untrusted cloud resource. The inspection module 112 deems the untrusted cloud resource to be safe (i.e., not vulnerable to being exploited by a cyberattack) when the untrusted cloud resource can be resolved.

When the untrusted cloud resource cannot be resolved, the inspection module 112 tries to register the subdomain of the untrusted cloud resource with a cloud service provider 150 (see arrow 108). The cloud service provider 150 provides a domain registration service for cloud resources, including the untrusted cloud resource, and may also be the provider of the cloud computing platform 120, for example.

When the untrusted cloud resource cannot be resolved and the subdomain of the untrusted cloud resource cannot be registered with the cloud service provider 150, the inspection module 112 deems the untrusted cloud resource to be safe. Otherwise, when the untrusted cloud resource cannot be resolved but the subdomain of the untrusted cloud resource can be registered with the cloud service provider 150, the inspection module 112 detects that the untrusted cloud resource is vulnerable to being exploited by a cyberattack.

The inspection module 112 may perform a response action in response to detecting that the codebase 131 has a dependency on a vulnerable cloud resource. The response action may include raising an alert 161 to notify an administrator (e.g., information technology (IT) personnel, security operations center (SOC) personnel, etc.) of the organization. The inspection module 112 may send the alert 161 to a computer system 170 that is employed by the administrator (see arrow 109). In the example of FIG. 1, the alert 161 is a message that is displayed on a display screen of the computer system 170. The alert 161 may indicate that the codebase 131 references a vulnerable cloud resource, the subdomain of the cloud resource, and other information regarding the cloud resource. The alert 161 may also be a signal to another cybersecurity component, for example.

Figure 2:
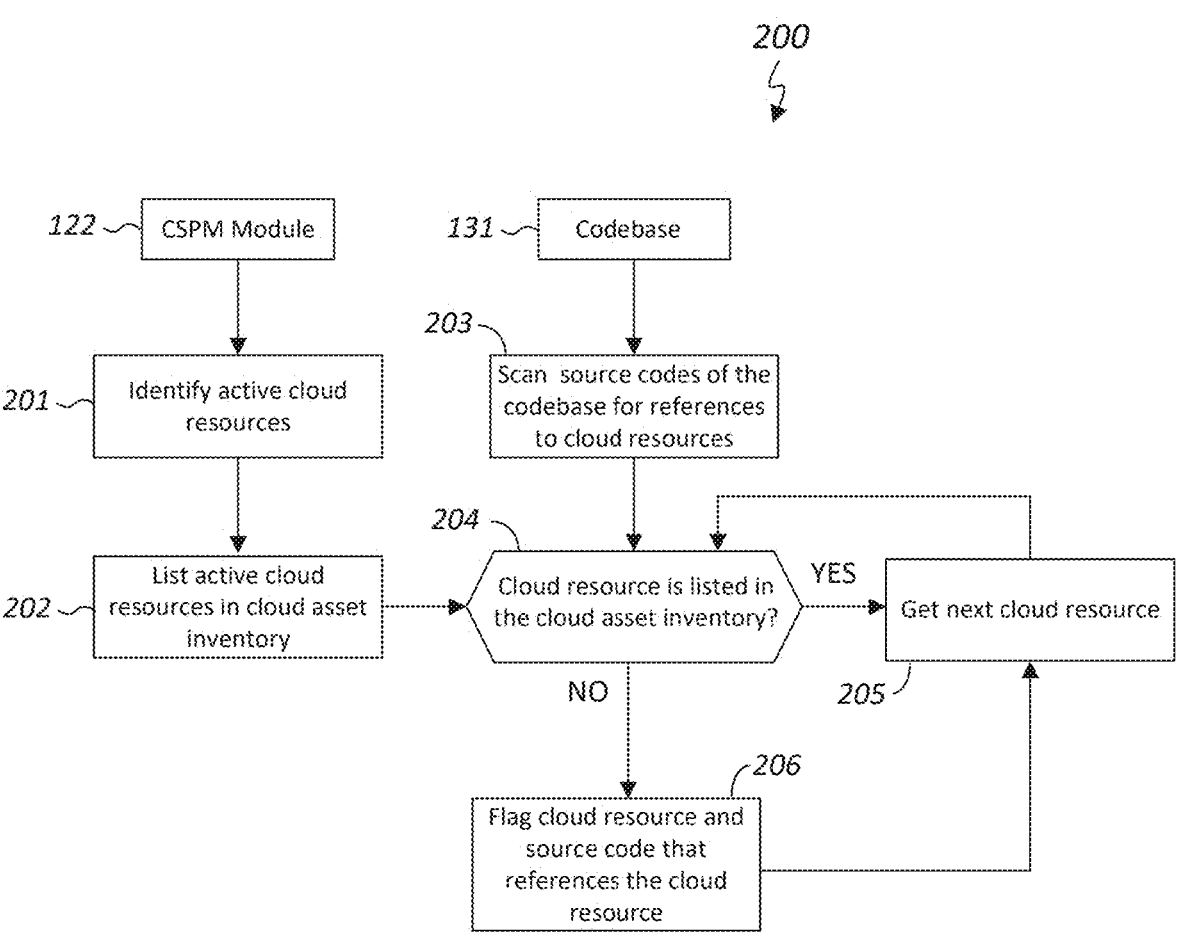
FIG. 2 shows a flow diagram of a method of scanning a codebase to identify untrusted cloud resources, in accordance with an embodiment of the present invention.

FIG. 2 shows a flow diagram of a method 200 of scanning a codebase to identify untrusted cloud resources, in accordance with an embodiment of the present invention. The method 200 is explained using previously disclosed components for ease of illustration.

In the example of FIG. 2, the CSPM tool 122 identifies all active cloud resources of an organization (step 201) and lists the identified active cloud resources in the cloud asset inventory 123 (step 202). The inspection module 112 receives a codebase 131 of the organization in the backend system 110 or other computer system where codebases are evaluated for dependency on vulnerable cloud resources. The inspection module 112 scans the source codes of the codebase 131 for references to cloud resources (step 203). For each reference to a cloud resource, the inspection module 112 determines if the cloud resource is listed in the cloud asset inventory 123 (step 204). If the cloud resource is listed in the cloud asset inventory 123, the inspection module 112 ignores the cloud resource and gets the next referenced cloud resource for evaluation (step 204 to step 205). Otherwise, if the cloud resource is not listed in the cloud asset inventory 123, the inspection module 112 detects that the cloud resource is untrusted and accordingly flags the cloud resource and source code of the codebase that references the cloud resource for further inspection (step 206).

Figure 3:
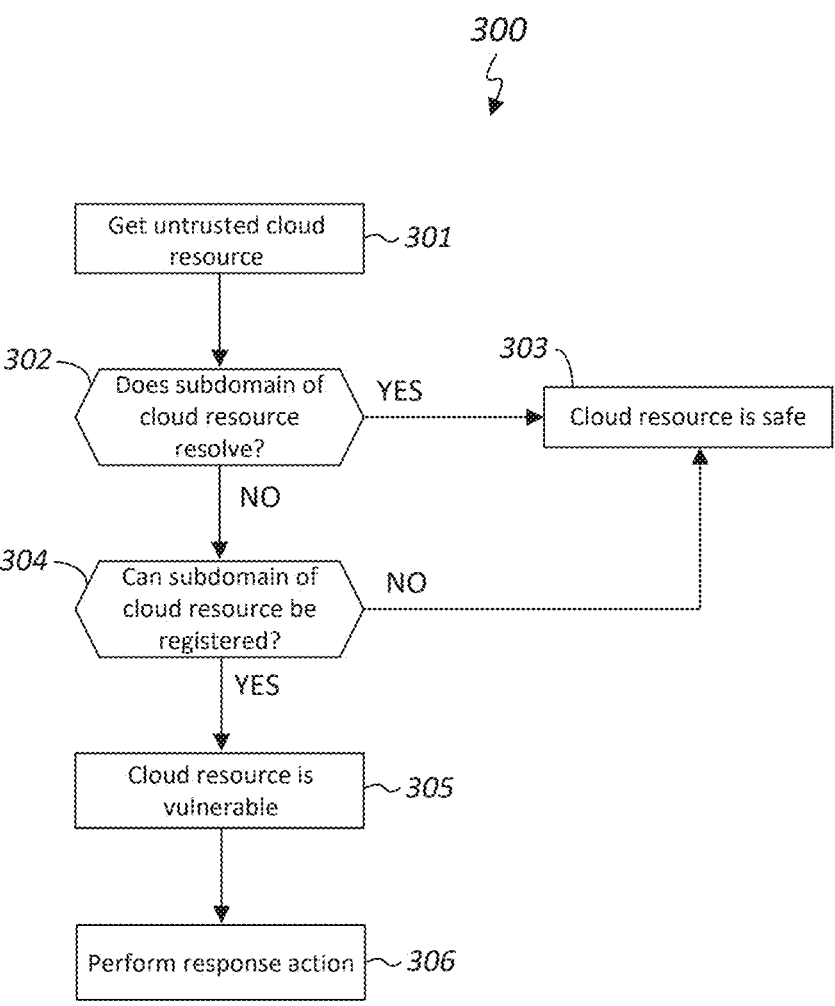
FIG. 3 shows a flow diagram of a method of inspecting untrusted cloud resources for vulnerability, in accordance with an embodiment of the present invention.

FIG. 3 shows a flow diagram of a method 300 of inspecting untrusted cloud resources for vulnerability, in accordance with an embodiment of the present invention. The inspection module 112 performs the method 300 for each cloud resource that has been flagged as untrusted in the method 200 for further inspection.

In the example of FIG. 3, the inspection module 112 retrieves a cloud resource (step 301) of a plurality of cloud resources of a codebase 131 that have been flagged as untrusted and thus need further inspection.

The inspection module 112 determines if the subdomain of the cloud resource resolves (step 302). The inspection module 112 deems the cloud resource to be safe from being exploited by a cyberattack when the subdomain of the cloud resource resolves (step 302 to step 303). Otherwise, when the subdomain of the cloud resource does not resolve, the inspection module 112 determines whether the subdomain of the cloud resource can be registered with the cloud service provider 150 (step 302 to step 304).

The inspection module 112 deems the cloud resource to be safe when the subdomain of the cloud resource cannot be registered with the cloud service provider 150 (step 304 to step 303). Otherwise, the inspection module 112 deems the cloud resource to be vulnerable when the subdomain of the cloud resource can be registered (step 304 to step 305). A subdomain of a cloud resource will not resolve for a variety of reasons, including because of network-related errors or because the subdomain is not registered. However, a subdomain that is not registered is available to be registered, and thus can be acquired by an attacker.

A response action, such as raising an alert, may be performed responsive to detecting a vulnerable cloud resource in the codebase 131 (step 306).

Figure 4:
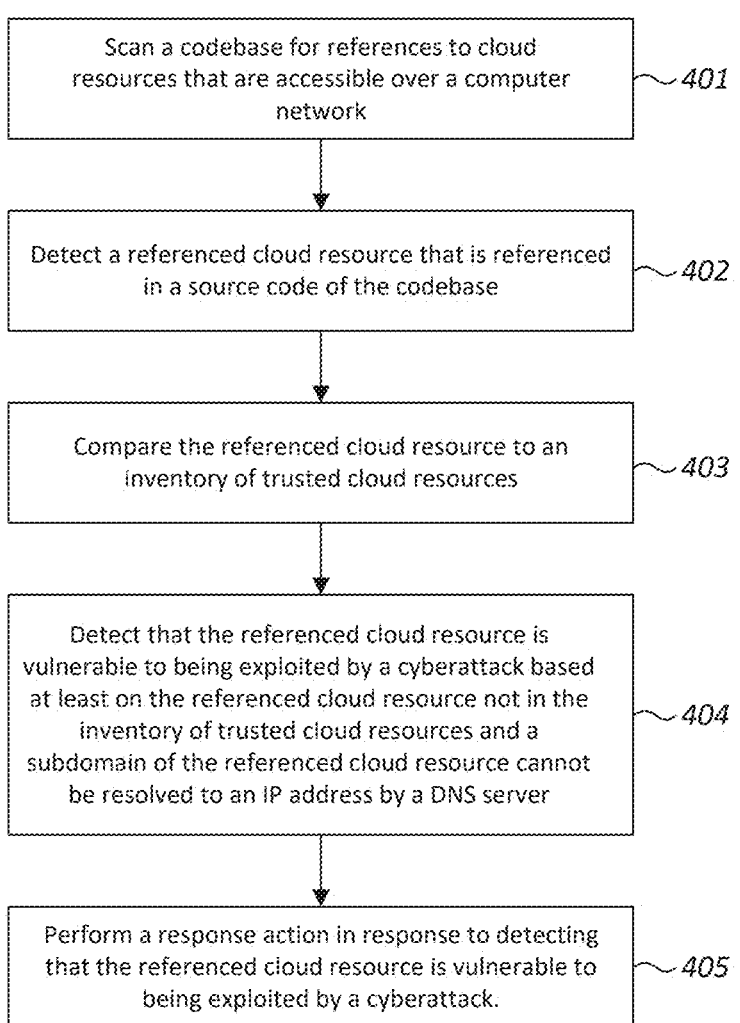
FIG. 4 shows a flow diagram of a method of scanning a codebase for vulnerability, in accordance with an embodiment of the present invention.

FIG. 4 shows a flow diagram of a method 400 of scanning a codebase for vulnerability, in accordance with an embodiment of the present invention. The method 400 may be performed using previously disclosed components. As can be appreciated, other components may also be employed without detracting from the merits of the present invention.

In the example of FIG. 4, an inspection module scans a codebase for references to cloud resources that are accessible over a computer network (step 401). The codebase may be received, by a computer system that hosts the inspection module, from a version control platform. The inspection module detects a referenced cloud resource that is referenced in a source code of the codebase by way of a subdomain of the referenced cloud resource (step 402). The inspection module compares the referenced cloud resource to an inventory of trusted cloud resources (step 403). The referenced cloud resource is detected as vulnerable to being exploited by a cyberattack based at least on the referenced cloud resource not in the inventory of trusted cloud resources and the subdomain of the referenced cloud resource cannot be resolved to an IP address by a DNS server (step 404). In addition to the referenced cloud resource not in the inventory of trusted cloud resources and the subdomain of the referenced cloud resource cannot be resolved to an IP address by a DNS server, the referenced cloud resource is further detected to be vulnerable to being exploited by a cyberattack based on the subdomain of the cloud resource being available to be registered with a cloud service provider. A response action is performed responsive to detecting that the referenced cloud resource is vulnerable to being exploited by a cyberattack (step 405). The response action may include raising an alert to notify an administrator of the dependency of the codebase on a vulnerable cloud resource.

Figure 5:
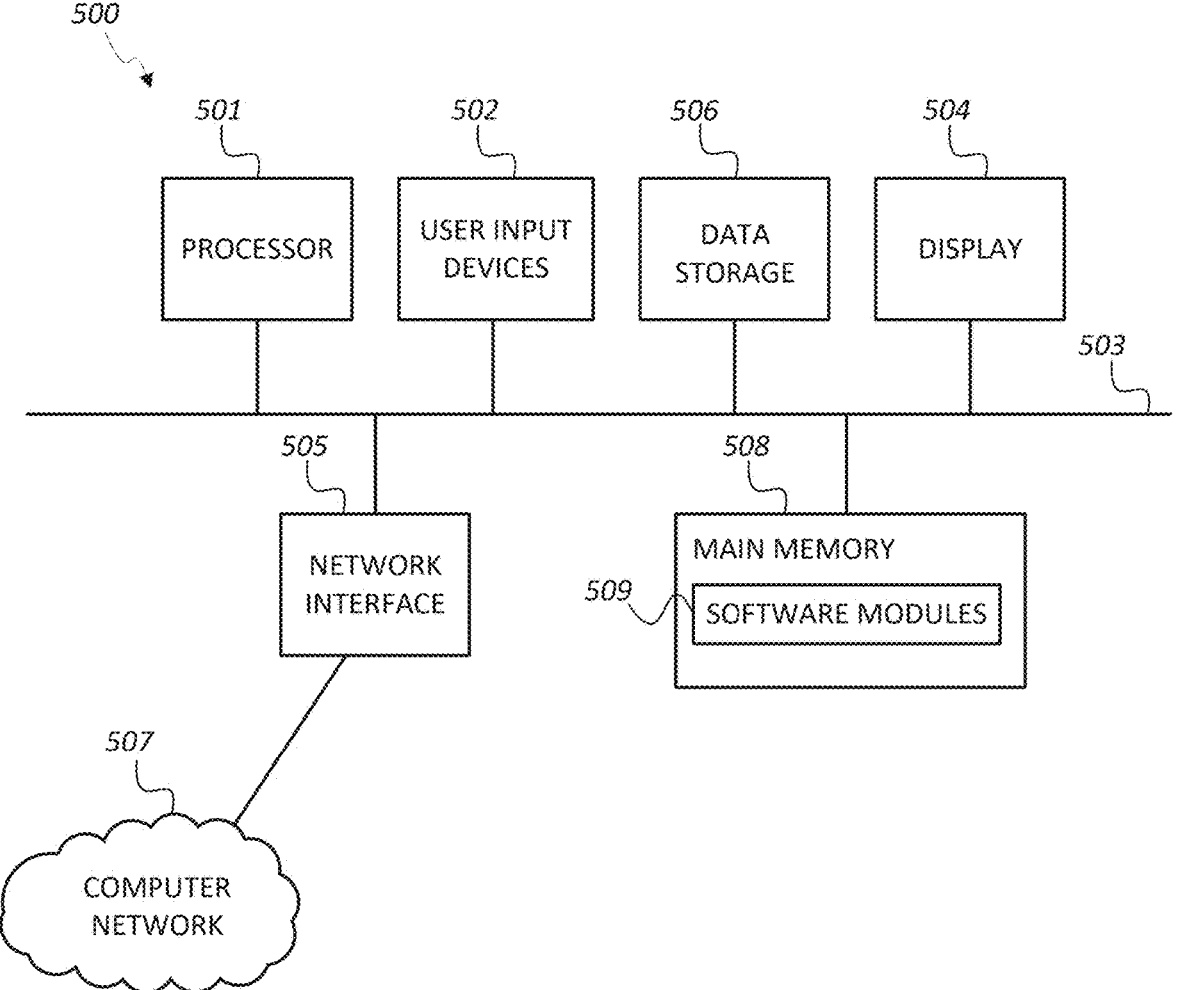
FIG. 5 shows a block diagram of a computer system that may be employed with embodiments of the present invention.

FIG. 5 shows a block diagram of a computer system 500 that may be employed with embodiments of the present invention. The computer system 500 may be employed as a backend system or other computer described herein. The computer system 500 may have fewer or more components to meet the needs of a particular cybersecurity application. The computer system 500 may include one or more processors 501. The computer system 500 may have one or more buses 503 coupling its various components. The computer system 500 may include one or more user input devices 502 (e.g., keyboard, mouse), one or more data storage devices 506 (e.g., hard drive, optical disk, solid state drive), a display screen 504 (e.g., liquid crystal display, flat panel monitor), a computer network interface 505 (e.g., network adapter, modem), and a main memory 508 (e.g., random access memory). The computer network interface 505 may be coupled to a computer network 507, which in this example includes the Internet.

The computer system 500 is a particular machine as programmed with one or more software modules 509, comprising instructions stored non-transitory in the main memory 508 for execution by at least one processor 501 to cause the computer system 500 to perform corresponding programmed steps. An article of manufacture may be embodied as computer-readable storage medium including instructions that when executed by at least one processor 501 cause the computer system 500 to be operable to perform the functions of the one or more software modules 509.

In one embodiment where the computer system 500 is configured as a backend system, the software modules 509 comprise instructions of an inspection module for scanning a codebase for dependency on vulnerable cloud resources.

While specific embodiments of the present invention have been provided, it is to be understood that these embodiments are for illustration purposes and not limiting. Many additional embodiments will be apparent to persons of ordinary skill in the art reading this disclosure.

8

What is claimed is:

1. A method of scanning a codebase to identify dependencies on vulnerable cloud resources, the method comprising:

identifying a plurality of trusted cloud resources that are accessible over a computer network;

receiving a codebase from a codebase repository;

scanning a source code of the codebase to detect one or more cloud resources that are referenced in the source code by way of a subdomain and that are accessible over the computer network;

for each detected cloud resource, flagging the detected cloud resource as an untrusted cloud resource responsive to determining that the detected cloud resource is not one of the plurality of trusted cloud resources; and for each untrusted cloud resource, detecting that the untrusted cloud resource is vulnerable to being exploited by a cyberattack in response to determining that the subdomain of the untrusted cloud resource cannot be resolved into an Internet Protocol (IP) address by a Domain Name System (DNS) server and that the subdomain of the untrusted cloud resource can be registered with a cloud service provider.

2. The method of claim 1, further comprising:

raising an alert responsive to detecting that the untrusted cloud resource is vulnerable to being exploited by a cyberattack.

3. The method of claim 2, wherein raising the alert includes sending a notification to an administrator.

4. The method of claim 1, wherein the codebase repository is a version control platform.

5. The method of claim 1, wherein the plurality of trusted cloud resources is hosted on a cloud computing platform.

6. The method of claim 5, wherein the plurality of trusted cloud resources is identified on the cloud computing platform by a Cloud Security Posture Management (CSPM) tool that is hosted on the cloud computing platform.

7. A computer system comprising at least one processor and a memory, the memory of the computer system storing instructions that when executed by the at least one processor of the computer system cause the computer system to:

receive a codebase from a codebase repository;

scan a source code of the codebase to detect one or more cloud resources that are referenced in the code source code by way of a subdomain and that are accessible over a computer network;

for each detected cloud resource, flag the detected cloud resource as an untrusted cloud resource responsive to determining that the detected cloud resource is not in an inventory of a plurality of trusted cloud resources; and for each untrusted cloud resource, detect that the untrusted cloud resource is vulnerable to being exploited by a cyberattack in response to determining that the subdomain of the untrusted cloud resource cannot be resolved into an Internet Protocol (IP) address by a Domain Name System (DNS) server and that the subdomain of the untrusted cloud resource can be registered with a cloud service provider.

8. The computer system of claim 7, wherein the instructions stored in the memory of the computer system when executed by the at least one processor of the computer system cause the computer system to:

raise an alert responsive to detecting that the untrusted cloud resource is vulnerable to being exploited by a cyberattack.

9. The computer system of claim 8, wherein the alert includes a notification that is sent to another computer.

10. The computer system of claim 7, wherein the codebase repository is a version control platform.

11. The computer system of claim 7, wherein the plurality of trusted cloud resources is hosted on a cloud computing platform.

12. The computer system of claim 11, wherein the plurality of trusted cloud resources is identified on the cloud computing platform by a Cloud Security Posture Management (CSPM) tool that is hosted on the cloud computing platform.

13. A method of scanning a codebase to identify dependencies on vulnerable cloud resources, the method comprising:

scanning a source code of a codebase for references to cloud resources that are accessible over a computer network;

detecting a referenced cloud resource that is referenced in the source code of of the codebase by way of a subdomain of the referenced cloud resource;

comparing the referenced cloud resource to an inventory of trusted cloud resources; and detecting that the referenced cloud resource is vulnerable to being exploited by a cyberattack based at least in response to determining that the referenced cloud resource is not listed in the inventory of trusted cloud resources and that the subdomain of the referenced cloud resource cannot be resolved into an Internet Protocol (IP) address by a Domain Name System (DNS) server.

14. The method of claim 13, further comprising:

further detecting that the referenced cloud resource is vulnerable to being exploited by a cyberattack in response to determining that the subdomain of the referenced cloud resource can be registered with a cloud service provider.

15. The method of claim 13, further comprising:

raising an alert responsive to detecting that the referenced cloud resource is vulnerable to a cyberattack.

16. The method of claim 15, wherein raising the alert includes sending a notification to another computer.

17. The method of claim 13, further comprising:

receiving the codebase from a codebase repository.

18. The method of claim 17, wherein the codebase repository is a version control platform.

19. The method of claim 13, wherein the trusted cloud resources in the inventory are hosted on a cloud computing platform.

20. The method of claim 19, wherein the trusted cloud resources in the inventory are identified on the cloud computing platform by a Cloud Security Posture Management (CSPM) tool that is hosted on the cloud computing platform.

* * * * *